United States Patent
Harada et al.

(10) Patent No.: US 10,321,343 B2
(45) Date of Patent: Jun. 11, 2019

(54) USER TERMINAL, RADIO BASE STATION, RADIO COMMUNICATION METHOD AND RADIO COMMUNICATION SYSTEM

(71) Applicant: NTT DOCOMO, INC., Tokyo (JP)

(72) Inventors: Hiroki Harada, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 15 days.

(21) Appl. No.: 15/502,517

(22) PCT Filed: Aug. 5, 2015

(86) PCT No.: PCT/JP2015/072222
§ 371 (c)(1),
(2) Date: Feb. 8, 2017

(87) PCT Pub. No.: WO2016/021634
PCT Pub. Date: Feb. 11, 2016

(65) Prior Publication Data
US 2017/0230854 A1    Aug. 10, 2017

(30) Foreign Application Priority Data
Aug. 8, 2014 (JP) .................................. 2014-162313

(51) Int. Cl.
*H04W 4/00* (2018.01)
*H04W 24/08* (2009.01)
(Continued)

(52) U.S. Cl.
CPC .......... *H04W 24/08* (2013.01); *H04W 16/32* (2013.01); *H04W 48/16* (2013.01);
(Continued)

(58) Field of Classification Search
CPC ..................... H04W 48/16; H04W 28/0289
See application file for complete search history.

(56) References Cited

U.S. PATENT DOCUMENTS 9,350,502 B2 * 5/2016 Chun ................ H04W 56/0015
9,596,067 B2 * 3/2017 Kim ...................... H04L 5/0005
(Continued)

OTHER PUBLICATIONS

Extended European Search Report issued in the counterpart European Patent Application No. 15829644.2, dated Jan. 29, 2018 (10 pages).
(Continued)

*Primary Examiner* — Melanie Jagannathan
(74) *Attorney, Agent, or Firm* — Osha Liang LLP

(57) ABSTRACT

The present invention is designed to reduce the increase of power consumption in user terminals in a radio communication system in which small cells are detected by using DRSs. A user terminal, according to one aspect of the present invention, is capable of communicating with radio base stations that form cells, and has a receiving section that receives detection/measurement signals that are transmitted respectively from a plurality of cells, a control section that controls the synchronization signals included in the received detection/measurement signals, and a receiving process section that measures the channel state measurement signals included in the received detection/measurement signals based on the selected synchronization signal.

11 Claims, 11 Drawing Sheets

(51) Int. Cl.
*H04W 16/32* (2009.01)
*H04W 48/16* (2009.01)
*H04W 56/00* (2009.01)
*H04W 72/04* (2009.01)
*H04W 52/02* (2009.01)

(52) U.S. Cl.
CPC ....... *H04W 52/0229* (2013.01); *H04W 56/00* (2013.01); *H04W 56/001* (2013.01); *H04W 72/04* (2013.01); *Y02D 70/00* (2018.01); *Y02D 70/1242* (2018.01); *Y02D 70/1262* (2018.01); *Y02D 70/1264* (2018.01)

(56) References Cited

U.S. PATENT DOCUMENTS

| | | | | |
|---|---|---|---|---|
| 2013/0094411 | A1 | 4/2013 | Zhang | |
| 2014/0198675 | A1* | 7/2014 | He | H04L 5/0048 370/252 |
| 2014/0301271 | A1* | 10/2014 | Xu | H04W 24/02 370/328 |
| 2015/0036612 | A1* | 2/2015 | Kim | H04B 17/00 370/329 |
| 2015/0049824 | A1* | 2/2015 | Kim | H04B 7/0456 375/267 |
| 2015/0304932 | A1* | 10/2015 | Wei | H04J 11/0069 370/331 |
| 2016/0013903 | A1* | 1/2016 | Kim | H04J 11/005 370/329 |
| 2016/0066255 | A1* | 3/2016 | Marinier | H04W 48/16 370/350 |
| 2016/0295500 | A1* | 10/2016 | Liu | H04W 48/16 |

OTHER PUBLICATIONS

ETRI; "Discussion on small-cell discovery"; 3GPP TSG RAN WG1 Meeting #72bis, R1-131141; Chicago, USA, Apr. 15-19, 2013 (3 pages).
International Search Report issued in PCT/JP2015/072222 dated Nov. 2, 2015 (2 pages).
Written Opinion of the International Searching Authority issued in PCT/JP2015/072222 dated Nov. 2, 2015 (4 pages).
3GPP TSG-RAN WG4 Meeting #71 Ad-hoc; R4-71AH-0061; Samsung; "View on DRS based cell identification requirements"; Beijing, China; Jun. 24-26, 2014 (5 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Office Action dated Oct. 27, 2015, in corresponding Japanese Patent Application No. 2014-162313 (7 pages).
Office Action dated Jun. 7, 2016, in corresponding Japanese Patent Application No. 2014-162313 (6 pages).
Sony, "Discussion on RRM measurement procedures in small cell on/off operation", 3GPP TSG RAN WG1 Meeting #77, R1-142474, Seoul, Korea, Mar. 19-Apr. 23, 2014 (6 pages).
Office Action issued in the counterpart European Patent Application No. 15829644.2, dated Jan. 4, 2019 (4 pages).

\* cited by examiner

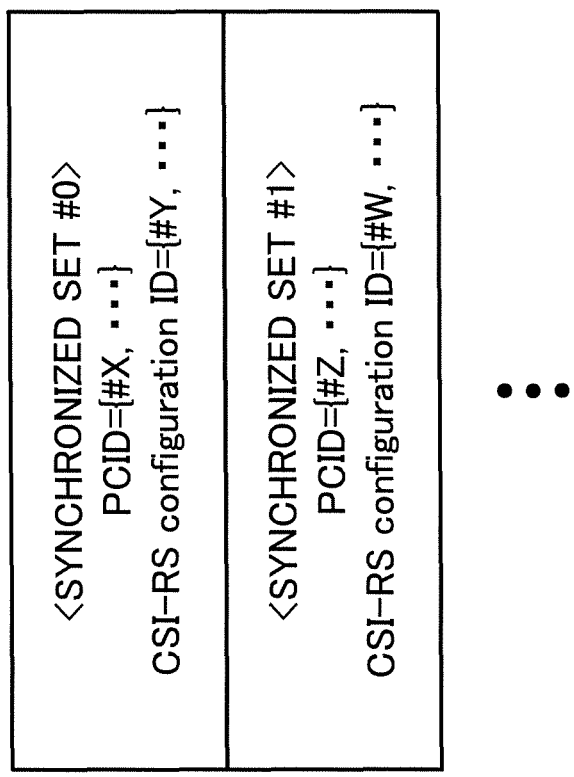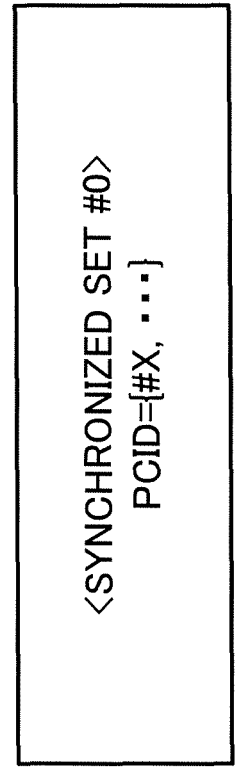
FIG.4A
FIG.4B

USER TERMINAL, RADIO BASE STATION, RADIO COMMUNICATION METHOD AND RADIO COMMUNICATION SYSTEM

TECHNICAL FIELD

The present invention relates to a user terminal, a radio base station, a radio communication method and a radio communication system that are applicable to next-generation communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (also referred to as, for example, "LTE-advanced" or "LTE enhancement" (hereinafter referred to as "LTE-A")) have been developed for the purpose of achieving further broadbandization and increased speed beyond LTE, and the specifications thereof have been drafted (Rel. 10/11).

In relationship to LTE-A systems, a HetNet (Heterogeneous Network), in which small cells (for example, pico cells, femto cells and so on), each having local a coverage area of a radius of approximately several tens of meters, are formed within a macro cell having a wide coverage area of a radius of approximately several kilometers, is under study. Also, in relationship to HetNets, a study is in progress to use carriers of different frequency bands between macro cells and small cells, in addition to carriers of the same frequency band.

Furthermore, for future radio communication systems (Rel. 12 and later versions), a study is in progress to introduce a new mechanism for small cell discovery. To be more specific, a user terminal detects the detection/measurement signal that is transmitted from a small cell, and establishes synchronization, conducts measurements and so on. Note that this detection/measurement signal may be referred to as the "discovery reference signal" (DRS). When a channel state measurement signal (for example, the CSI-RS (Channel State Information Reference Signal) is included in the DRS, the user terminal detects and measures this channel state measurement signal based on the timing of synchronization.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

However, cases might occur where a user terminal, having received DRSs from a plurality of small cells, detects a plurality of synchronizing timings. In this case, trying CSI-RS detection with respect to all the detected timings places a significant burden on the user terminal, which then has a threat of increasing the battery consumption of the user terminal.

The present invention has been made in view of the above, and it is therefore an object of the present invention to provide a user terminal, a radio base station, a radio communication method and a radio communication system, whereby the increase of power consumption in user terminals can be reduced in a radio communication system in which cells are detected by using DRSs.

Solution to Problem

According to one aspect of the present invention, a user terminal has a receiving section that receives a detection/measurement signal, which includes a synchronization signal and a channel state measurement signal, and information that includes a first identifier that relates to the synchronization signal, and a control section that applies control so that the synchronization signal to correspond to the first identifier is detected, and the channel state measurement signal that relates to the synchronization signal is measured.

Advantageous Effects of Invention

According to the present invention, it is possible to reduce the increase of power consumption in user terminals in a radio communication system in which small cells are detected by using DRSs.

BRIEF DESCRIPTION OF DRAWINGS

FIG. 4 provide diagrams to show examples of synchronized sets according to a second embodiment.

DESCRIPTION OF EMBODIMENTS

Figure 1:
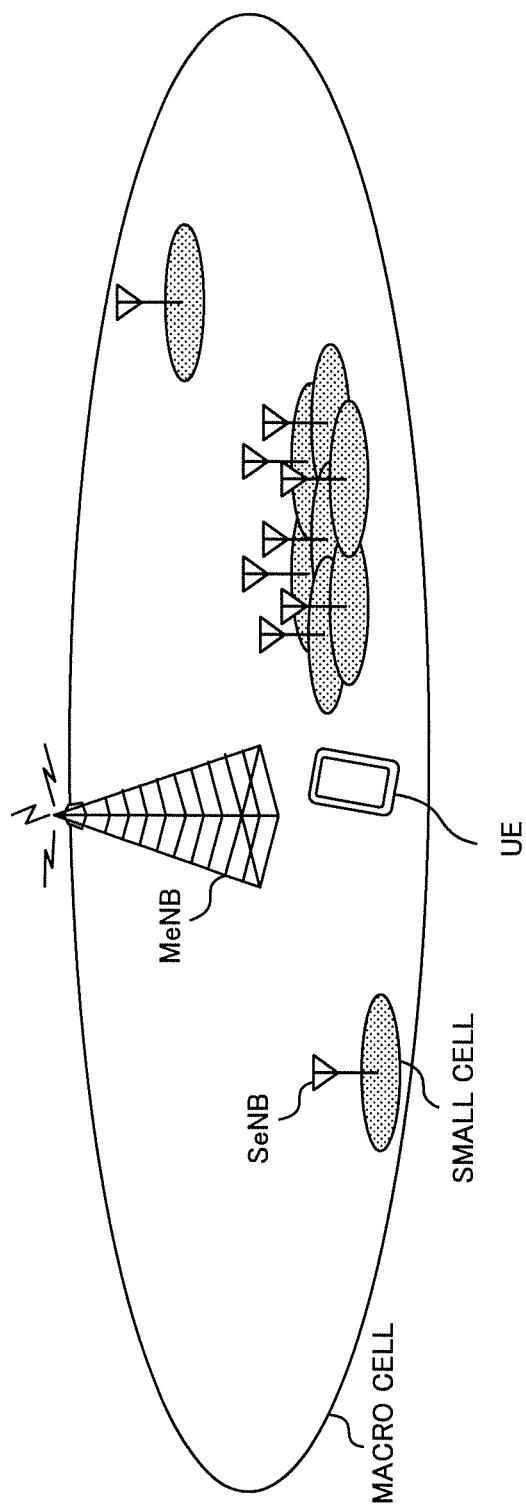
FIG. 1 is a diagram to explain the concept of a HetNet.

FIG. 1 is a diagram to explain the concept of a HetNet. A HetNet is comprised of a radio base station that forms a macro cell (hereinafter also referred to as a "macro base station" (MeNB)). Radio base stations that form small cells (hereinafter also referred to as "small base stations" (SeNB)), and a user terminal that can communicate with these radio base stations. As shown in FIG. 1, in a HetNet, at least part of the small cells are placed to geographically overlap the macro cell.

As for the mode of HetNet operations, there may be a plurality of possible scenarios such as carrier aggregation (CA), dual connectivity (DC) and so on. CA is a technique to bundle a plurality of frequency blocks (also referred to as "component carriers" (CCs), "carriers," "cells," etc.) into a wide band. Each CC has, for example, a maximum 20 MHz bandwidth, so that, when maximum five CCs are bundled, a wide band of maximum 100 MHz is provided.

DC is the same as CA in bundling a plurality of CCs (or cells) into a wide band. While CA holds the premise that CCs (or cells) are connected via ideal backhaul and is capable of coordinated control that produces very little delay time, DC presumes cases in which cells are connected via non-ideal backhaul, which produces delay time that is more than negligible.

Consequently, in DC, cells are run by separate radio base stations, and user terminals communicate by connecting with cells (or CCs) of varying frequencies that are run under different radio base stations. So, when DC is employed, a plurality of schedulers are provided individually, and these multiple schedulers each control the scheduling of one or more cells (CCs) managed thereunder. Based on this, DC may be referred to as "inter-base station CA" (inter-eNB CA). Note that, in DC, carrier aggregation (intra-eNB CA) may be employed per individual scheduler (that is, radio base station) that is provided.

In the operation mode of CA/DC, for example, it is possible to use a macro cell as a primary cell (PCell) and a small cell as a secondary cell (SCell). Here, the primary cell (PCell) refers to the cell that manages RRC connection, handover and so on when CA/DC is used, and is also a cell that requires UL communication such as data and feedback signals from user terminals. The primary cell is always configured in the uplink and the downlink. A secondary cell (SCell) refers to another cell that is configured apart from the primary cell when CA/DC is employed. A secondary cell may be configured in the downlink alone, or may be configured in both the uplink and the downlink at the same time.

A study is in progress to introduce a new mechanism pertaining to small cell discovery in future radio communication systems (Rel. 12 and later versions). To be more specific, a user terminal detects detection/measurement signals transmitted from small cells, and establishes synchronization, conduct measurements, and so on. Note that this detection/measurement signal may be referred to as the "discovery reference signal" (DRS).

Figure 2:
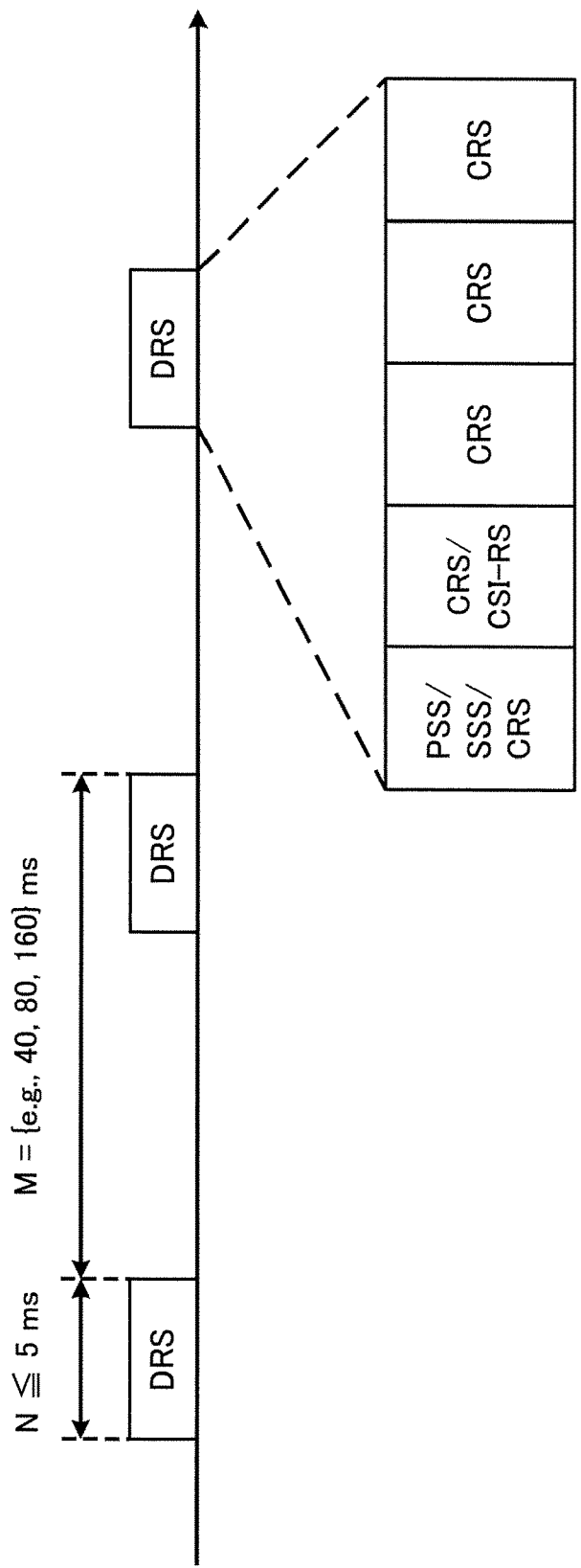
FIG. 2 is a diagram to explain the signal configuration of the DRS.

FIG. 2 provide diagrams to explain the signal configuration of the DRS. The DRS can be constituted by a combination of a plurality of signals transmitted in a predetermined period N. The DRS is transmitted in the DwPTS (Downlink Pilot Time Slot) in DL (downlink) subframes or special subframes in TDD (Time Division Duplex). The predetermined period N is, for example, 5 ms (five subframes) at a maximum, but this is by no means limiting. Also, the DRS is transmitted in a predetermined cycle M. The predetermined cycle M is, for example, 40, 80 or 160 ms, but this is by no means limiting. N and M may be referred to as the "DRS measurement period" (or the "DRS occasion") and the "DRS cycle," respectively.

The DRS can be constituted by a combination of synchronization signals (PSS (Primary Synchronization Signal)/SSS (Secondary Synchronization Signal)) and the CRS (Cell-specific Reference Signal) of existing systems (for example, LTE Rel. 11), a combination of synchronization signals (PSS/SSS), the CRS and the CSI-RS (Channel State Information Reference Signal) of existing systems, and so on. For example, the example of the DRS shown in FIG. 2 includes a PSS/SSS/CRS in the first subframe, a CRS/CSI-RS in the second subframe, and CRSs in the third to the fifth subframe. Note that the DRS is by no means limited to these configurations. For example, the DRS may contain new reference signals (including ones that modify conventional reference signals).

Measurements to use the DRS ("DRS-based measurements") are configured in the user terminal from the network (for example, a macro base station). This configuration is reported by using, for example, assist information for DRS detection. The assist information includes information that is required in DRS detection, and may include, for example, the state of synchronization between small cells and macro cells, a list of small cell identifiers (IDs), the transmission frequency, the transmission timing (for example, the DRS measurement period, the DRS cycle, etc.), the transmission power, the number of antenna ports and the signal configuration of the DRS, and so on. Note that the assist information may be transmitted from the macro base station, or may be transmitted from the small base stations. Also, the assist information may be transmitted in higher layer signaling (for example, RRC signaling), or may be transmitted in broadcast information.

The network can configure a DMTC (Discovery Measurement Timing Configuration) in the user terminal, per frequency. A DMTC includes at least a DRS cycle and a DRS measurement timing offset that is based on the timing of the PCell. That is, although the user terminal can learn the timings and cycles of the DRS measurement period from the DMTCs reported from the network, the actual timing to receive each reference signal in the DRS measurement period is detected by using the PSS/SSS in the DRS measurement period.

Here, the PSS and the SSS included in the DRS are used in an early stage of cell search upon small cell discovery. To be more specific, the PSS is used to synchronize the symbol timing and to detect the small cells' local identifier. Also, the SSS is used to detect the radio frame and to detect the small cell's group identifier. Also, with the PSS and the SSS, it becomes possible to acquire the physical cell ID (PCID: Physical Cell Identifier) of the small cell.

The user terminal, in which DRS-based measurements are configured, may assume that the PSS/SSS/CRS are included in the DRS measurement period. Also, the user terminal may assume that each cell's DRS includes the PSS/SSS, one symbol each, in the DRS measurement period. Furthermore, the user terminal may assume that the CRS is transmitted in all the DL subframes in the DRS measurement period.

When, furthermore, CSI-RS measurements are configured from the network, the user terminal may assume that the CSI-RS is included in the DRS measurement period, in addition to the PSS/SSS/CRS. The CSI-RS configuration that is applied may be, for example, a resource for signal power measurements (CSI-RS resource), or may be a resource for interference power measurements (CSI-IM (Interference Measurement) resource). To be more specific, the CSI-RS resource may represent a non-zero-power CSI-RS, and the CSI-IM resource may represent a zero-power CSI-RS.

A CSI-RS configuration to represent the radio resource for CSI-RS measurements may be reported from a radio base station to the user terminal. Also, the mapping configuration of the CSI-RS (CSI-RS RE configuration) may be reported.

Also, a structure to apply varying relative subframe offsets on a per CSI-RS configuration basis may be employed. Here, the relative subframe offset refers to the offset between the subframe in which the SSS is transmitted and the subframe in which the CSI-RS is transmitted. Note that, although the assumption holds that, in the DRS measurement period, the CSI-RS is transmitted in one subframe per cell, this is by no means limiting. For example, in a predetermined CSI-RS configuration, the CSI-RS may be transmitted in a plurality of subframes in the DRS measurement period.

The user terminal measures the RSRP (Reference Signal Received Power), the RSRQ (Reference Signal Received Quality), the RSSI (Received Signal Strength Indicator) and so on by measuring the CRS and/or the CSI-RS. The user terminal reports the measurement results to a radio base station (for example, the macro base station) with the measured cell's physical cell ID and/or TP identification information. The TP identification information is information that varies per TP, and, for example, the CSI-RS resource element configuration (RE configuration), the scrambling ID, the subframe offset, the cover code, and the combinations of these can be used. In this way, by using the DRS, the user terminal can identify each transmission point (for example, each small cell), and feed back the measurement results.

When a channel state measurement signal (for example, the CSI-RS) is included in the DRS, the user terminal detects and measures the channel state measurement signal based on a predetermined synchronizing timing (PSS/SSS timing) included in the DRS measurement period. In the use case to use CSI-RS measurements, a plurality of transmission points (TPs) (for example, radio base stations, cells and so on) are synchronized, so that these transmission points are assumed to use mutually orthogonal CSI-RS resources. Note that, when "a plurality of TPs are synchronized," this may mean that signals transmitted by a plurality of TPs are received in perfect synchronization, or this might mean that these signals are received with gaps less than the cyclic prefix length.

Figure 3:
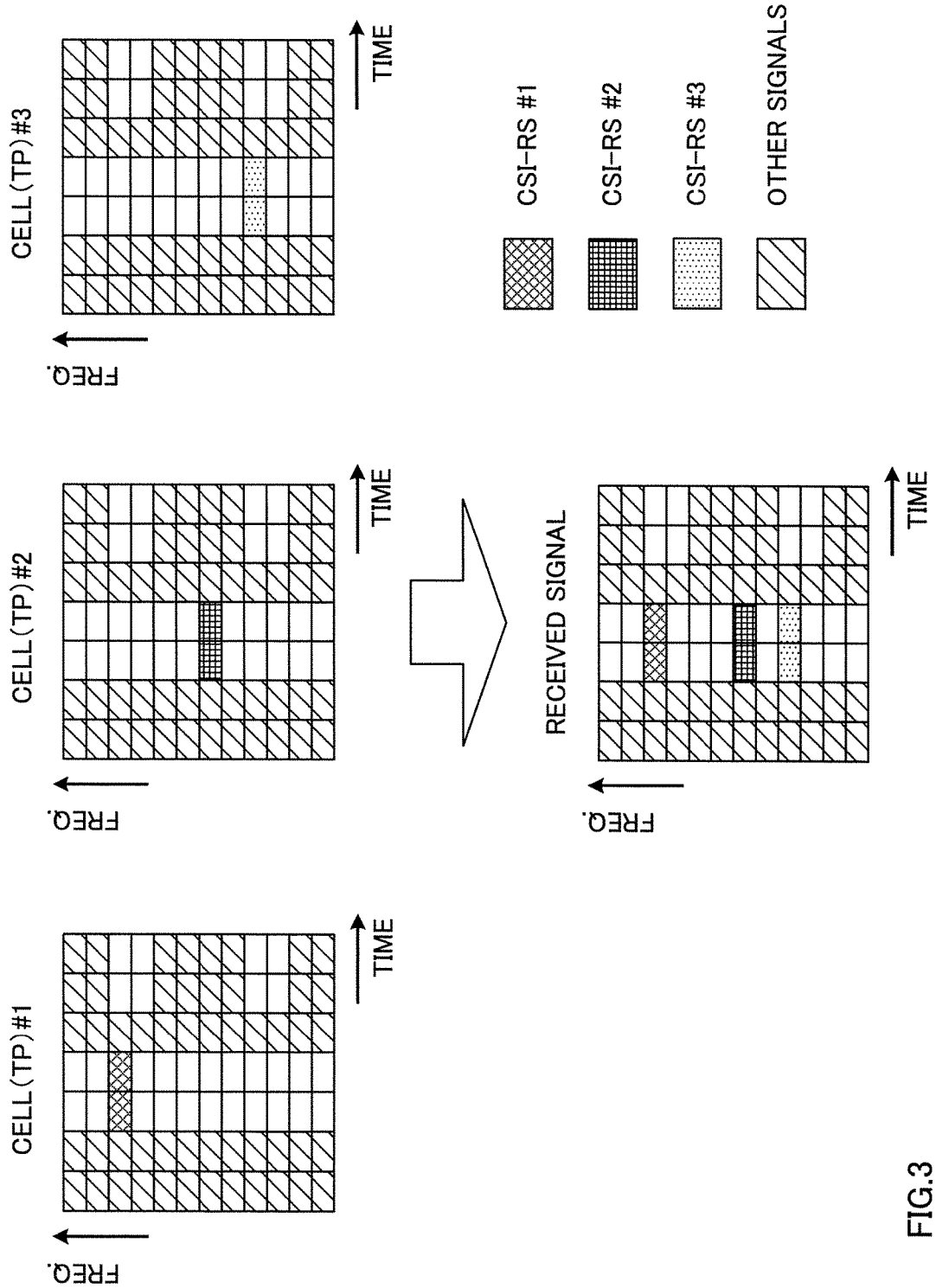
FIG. 3 is a diagram to show an example of orthogonal CSI-RS resource allocation.

FIG. 3 is a diagram to show examples of orthogonal CSI-RS resource allocation. FIG. 3 shows the radio resources of transmitting signals to which CSI-RSs are allocated in a plurality of cells (cells #1 to #3) that are synchronized, and the radio resources of received signals in the user terminal. In the examples of FIG. 3, while a given cell (TP) transmits the CSI-RS in given resources, other nearby cells (TPs) do not transmit signals (muting) in these resources, so that orthogonality is established. In this case, the user terminal can receive and detect the CSI-RS transmitted from each synchronized cell (TP) at a single FFT timing.

However, cases might occur where the user terminal, having received DRSs from a plurality of small cells, detects a plurality of synchronizing timing (PSS/SSS timings). For example, the case where each transmission point is not synchronized is one. In this case, trying CSI-RS measurements with respect to all the detected timings (for example, repeating measurements by changing the FFT (Fast Fourier Transform) timing) results in placing a significant burden on the user terminal, which then has a threat of increasing the battery consumption of the user terminal.

So, the present inventors have come up with the idea of allowing a user terminal, which has detected a plurality of PSS/SSS timings, to adequately determine the PSS/SSS timing to use for CSI-RS detection (measurements), in a radio communication system in which cells (for example, small cells) are detected by using DRSs. By this means, in a radio communication system in which small cells are detected by using DRSs, even when a user terminal detects a plurality of synchronizing timings in the DRS measurement period, it is still possible to prevent the burden of measurements on the user terminal from increasing, so that it is possible to reduce the increase of battery consumption in the user terminal.

Now, embodiments of the present invention will be described below in detail with reference to the accompanying drawings. Note that, although cases will be shown in the following description where small cells are detected by using DRSs in a HetNet operation mode in which small cells formed by small base stations are placed within a macro cell formed by a macro base station, the embodiments are by no means limited to this.

With a first embodiment, a user terminal detects the CSI-RS in a DRS measurement period by using the strongest PSS/SSS timing (where, for example, the received power is the highest, the received quality is the highest, and so on) among the PSSs/SSSs that are detected. According to this structure, the user terminal can determine one timing from among a plurality of PSS/SSS timings without making significant changes to its conventional apparatus structure, so that it is possible to save the cost of implementing the user terminal and, furthermore, execute CSI-RS detection. The first embodiment is suitable when all cells (TPs) are synchronized.

With a second embodiment, the identifiers of PSSs/SSSs (for example, PCIDs) that can be used as CSI-RS detection timings are reported from the network to the user terminal. According to this structure, even when a cell that transmits the PSS/SSS at a different timing from the PSS/SSS timing of a synchronized cell (TP) group (cluster) that transmits CSI-RSs is present in the same frequency, distinction can be made by using the above identifiers.

For the above-noted reporting according to the second embodiment, a "synchronized set" can be used. Here, a "synchronized set" refers to information about a PSS/SSS that can be used as a reference for the CSI-RS detection timings included in the DRS. For example, the information about PSSs/SSSs may include a PCID group (PCID set) of PSSs/SSSs to which the same receiving FFT timing can be applied.

Also, a synchronized set may include, in addition to a PCID group, information that represents the specific CSI-RSs to detect based on the PSSs/SSSs indicated in the PCID group. For example, the information to indicate specific CSI-RSs may be a CSI-RS configuration ID group. CSI-RS configuration IDs may be reported in CSI-RS configuration information. Also, if no CSI-RS configuration information is reported, the user terminal may identify the relationships between CSI-RS-related parameters (for example, resource element configurations, subframe offsets, cover codes and scrambling IDs, or the combination of these) and CSI-RS configuration IDs based on a-priori information that is provided in advance. Here, this a-priori information may be reported from a radio base station to the user terminal in higher layer signaling (for example, RRC signaling), or may be reported in broadcast information.

Note that a synchronized set may include information about the frequency that is applied (for example, a small cell's carrier frequency). Alternatively, a synchronized set may be included in the measurement configuration information (MeasObjectEUTRA) for each frequency. In these cases, a structure to provide different synchronized sets on a per frequency basis may be used. Note that each ID group included in synchronized sets is comprised of one or more IDs.

A plurality of synchronized sets may be configured in a user terminal. For example, when it is necessary to use different FFT timings for a plurality of clusters that use CSI-RSs, it is preferable to configure a plurality of synchronized sets.

When a PCID group (PCID set) and a CSI-RS configuration ID group are included in one synchronized set, the user terminal can use any of the PSS/SSS timings that relate to this PCID group as a common timing to detect each CSI-RS indicated in the CSI-RS configuration ID group.

FIG. 4 provide diagrams to show examples of synchronized sets according to the second embodiment. FIG. 4A shows a plurality of synchronized sets (synchronized sets #0, #1, . . . ) configured in the user terminal. Synchronized set #0 represents a plurality of PCIDs, including #X, as PCIDs, and represents a plurality of IDs, including #Y, as CSI-RS configuration IDs. Synchronized set #1 represents a plurality of PCIDs, including #Z, as PCIDs, and represents a plurality of IDs, including #W, as CSI-RS configuration IDs. In this case, for example, the CSI-RS which #Y indicates can be detected by using the PSS/SSS timing indicated by #X, and the CSI-RS which #W indicates can be detected by using the PSS/SSS timing indicated by #Z.

Also, when a PCID group (PCID set) alone is included in one synchronized set, the user terminal can use any of the PSS/SSS timings that relate to this PCID group as a common timing to detect all the CSI-RSs. For example, when all cells are synchronized in a predetermined frequency, a PCID group alone may be included in a synchronized set, so that it is possible to reduce the volume of signaling compared to when a CSI-RS configuration ID group is included in the synchronized set.

FIG. 4B shows one synchronized set (synchronized set #0) that is configured in the user terminal. Synchronized set #0 represents a plurality of PCIDs, including #X, as PCIDs. In this case, for example, it is possible to detect CSI-RSs by using the PSS/SSS timing indicated by #X.

Also, when the user terminal receives no synchronized set even though CSI-RS measurements are configured, the user terminal can assume that all the cells (TPs) in a predetermined frequency are synchronized. In this case, the user terminal can use any of the PSS/SSS timings that are detected, as a common timing to detect all the CSI-RSs. In this case, it is not necessary to report synchronized sets, so that the volume of signaling can be reduced significantly.

As described above, according to the second embodiment, the increase of the volume of signaling can be reduced by improving the method of reporting, and, furthermore, even scenarios in which a plurality of synchronized clusters are present can be supported, so that it is possible to improve the flexibility of operation.

Note that, when synchronized sets are reported from a macro cell to the user terminal, it is possible to report synchronized sets that relate to all the small cells that overlap the macro cell. However, this is by no means limiting. For example, based on the geographic location of the user terminal, synchronized sets that relate to part of the small cells that are located near the user terminal may be reported.

Note that a synchronized set may include, instead of a PCID group, a different piece of information that can specify the small cell. Also, a synchronized set may include, instead of a CSI-RS configuration ID group, a different piece of information about the radio resources where the CSI-RS is allocated.

Now, a plurality of specific scenarios that can be assumed in a radio communication system to use DRSs will be described below with reference to cases in which each embodiment is applied.

Scenario #1 presents an environment, in which all cells (TPs) in a frequency are synchronized. The first embodiment can support scenario #1. Also, according to the second embodiment, the user terminal can assume, without being reported, that all cells (TPs) are synchronized, so that the volume of signaling can be reduced significantly compared to the other scenarios.

Scenario #2 presents an environment, in which the cells (TPs) that transmit CSI-RSs in a frequency are all synchronized, and in which cells that operate in other timings are also present. To be more specific, this is an environment, in which cells (TPs) that transmit CSI-RSs are synchronized within a cluster, and are synchronized between clusters as well. Here, a "small cell cluster" refers to a group of one or more small cells that are synchronized.

Figure 5A:
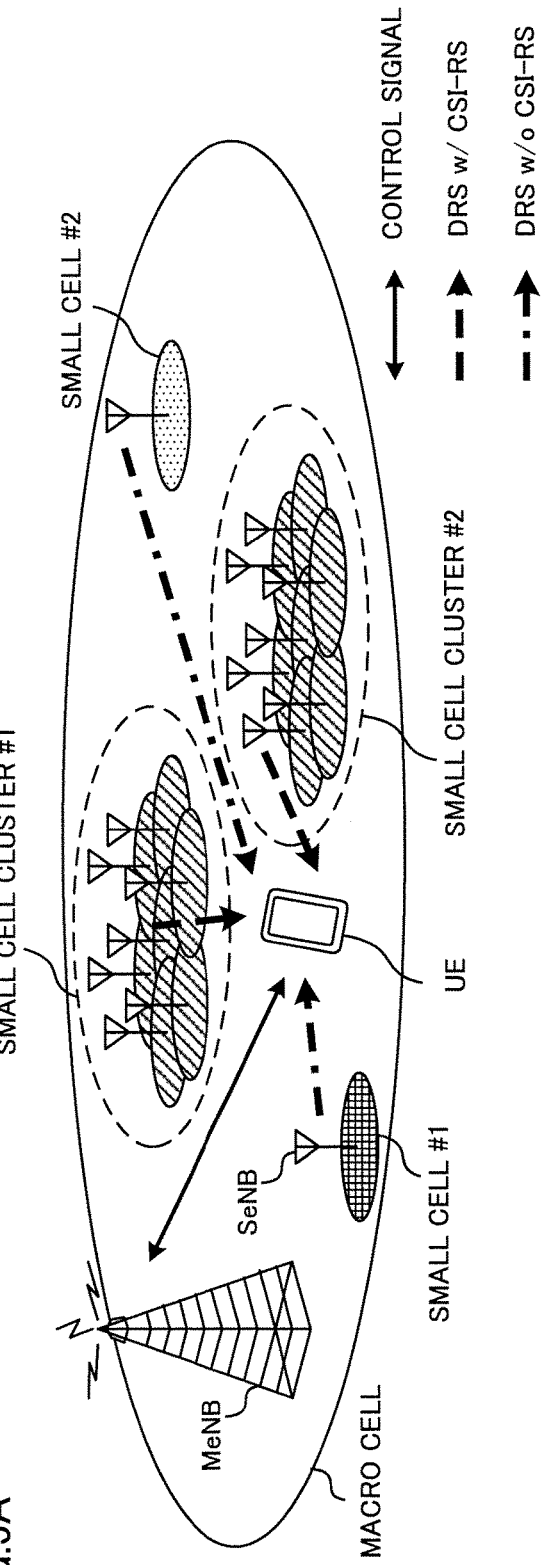
FIG. 5 provide diagrams to show examples of scenario #2.
Figure 5B:
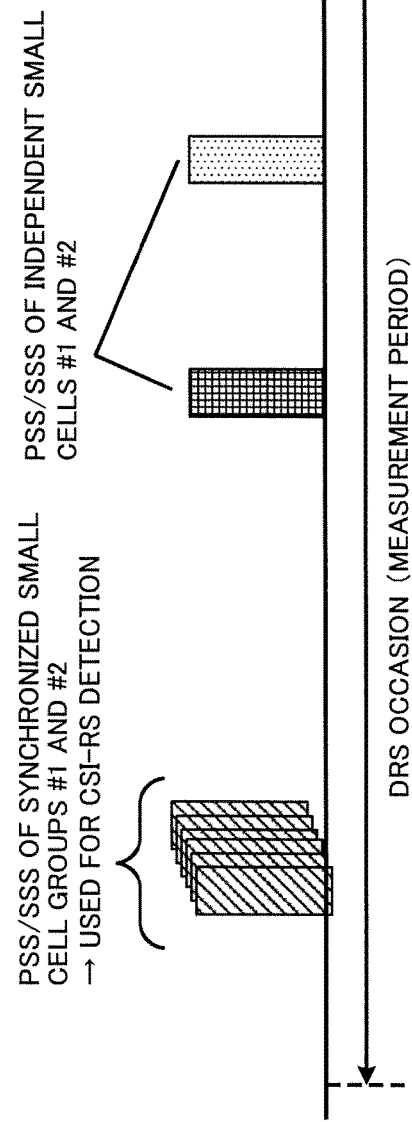

FIG. 5 provide diagrams to show examples of scenario #2. FIG. 5A is a diagram to show the configuration of cells according to scenario #2. As shown in FIG. 5A, a user terminal transmits and receives control signals with a macro cell. Also, the user terminal receives DRSs from each small cell. Small cell clusters #1 and #2 are cell groups that transmit CSI-RSs in the DRS measurement period, and all the small cells are synchronized in these clusters, and between these clusters. On the other hand, small cells #1 and #2 are both cells that do not transmit CSI-RSs in the DRS measurement period, and are not synchronized with either of small cell clusters #1 and #2. FIG. 5B shows each cell's PSS/SSS in the DRS measurement period according to scenario #2. Small cell clusters #1 and #2, which are synchronized, have the same PSS/SSS timing with the clusters and between the clusters.

With scenario #2, one CSI-RS detection timing is needed in the frequency which the small cells use. According to the first embodiment, when the received power of the PSS/SSS of small cell cluster #1 or #2 in the user terminal is greater than the received power of the PSSs/SSSs of small cells #1 and #2, it is possible to detect the CSI-RSs adequately. Also, according to the second embodiment, the PCID group of each small cell included in small cell clusters #1 and #2 may be reported to the user terminal as PCID groups of PSSs/SSSs that can be used as CSI-RS detection timings, so that the user terminal can learn adequate CSI-RS detection timings. In this case, as shown in FIG. 4B, synchronization sets to include these PCID groups may be reported, and CSI-RS configuration IDs need not be included.

Scenario #3 presents an environment, in which part of the cells (TPs) that transmit CSI-RSs in a frequency are not synchronized (for example, between clusters), and in which cells that operate in other timings are also present. To be more specific, this is an environment, in which cells (TPs) that transmit CSI-RSs are synchronized within clusters, but are not synchronized between clusters.

Figure 6A:
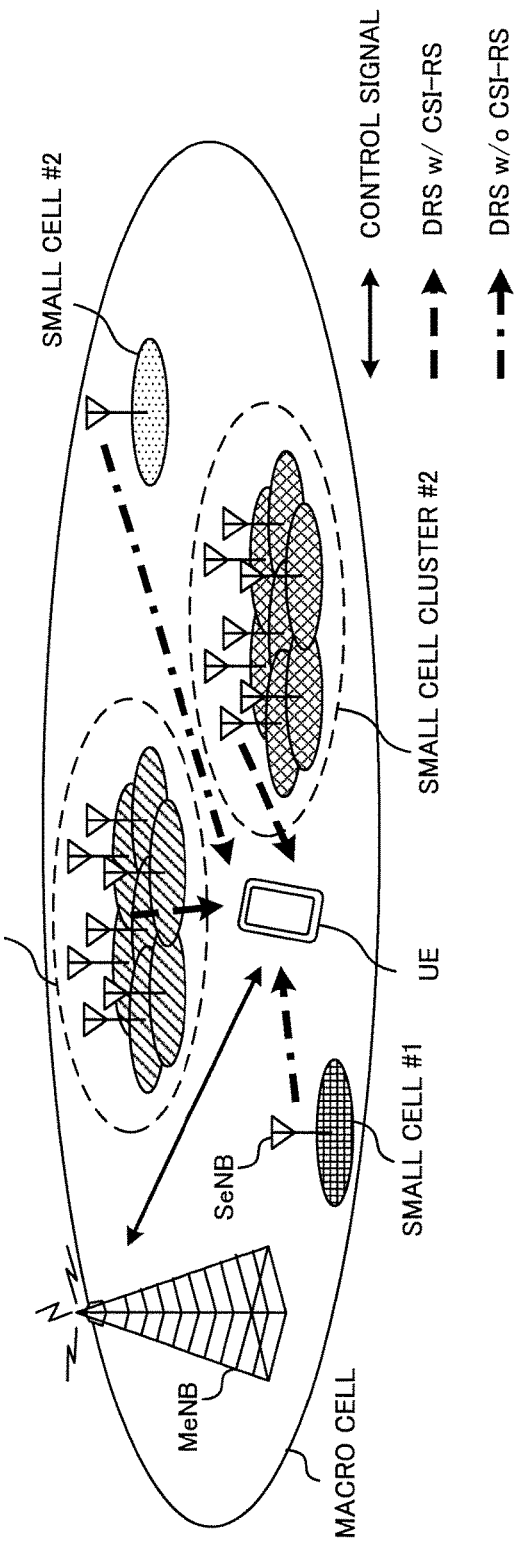
FIG. 6 provide diagrams to show examples of scenario #3.
Figure 6B:
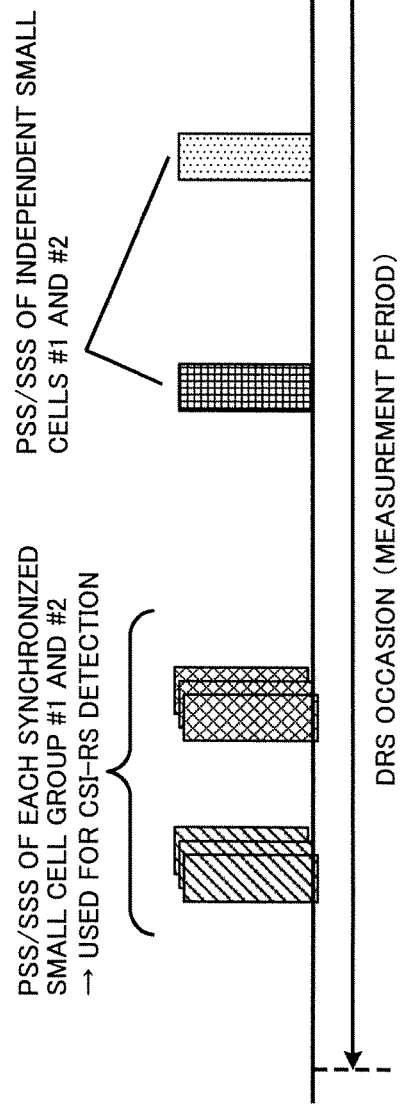

FIG. 6 provide diagrams to show examples of scenario #3. FIG. 6A is a diagram to show an example of the configuration of cells according to scenario #3. FIG. 6A is the same as FIG. 5A except that small cell clusters #1 and #2 are synchronized within the respective clusters but are not synchronized between the clusters. FIG. 6B shows each cell's PSS/SSS in the DRS measurement period according to scenario #3. Small cell clusters #1 and #2, which are synchronized, have the same PSS/SSS timing within the respective clusters, but have different PSS/SSS timings between the clusters.

According to scenario #3, in the frequencies which the small cells use, CSI-RS detection timings that correspond separately to each cluster are needed. According to the first embodiment, when the received power of the PSS/SSS of small cell cluster #1 (#2) in the user terminal is greater than the received power of the PSSs/SSSs of small cells #1 and #2 and small cell cluster #2 (#1), it is possible to detect the CSI-RSs of small cell cluster #1 (#2) adequately. Also, according to the second embodiment, PSS/SSS PCID groups are associated and reported to the user terminal per CSI-RS group that is synchronized, so that the user terminal can learn adequate CSI-RS detection timings. In this case, as shown in FIG. 4A, the PCIDs and CSI-RS configuration IDs of small cell cluster #1 may be included in a given synchronized set, and the PCIDs and CSI-RS configuration IDs of small cell cluster #2 may be included in and reported as another synchronized set.

(Structure of Radio Communication System)

Now, the structure of the radio communication system according to an embodiment of the present invention will be described below. In this radio communication system, the above-described radio communication methods according to the first and/or the second embodiments are employed. Note that the above-described radio communication methods of the above-described embodiments may be applied individually or may be applied in combination.

Figure 7:
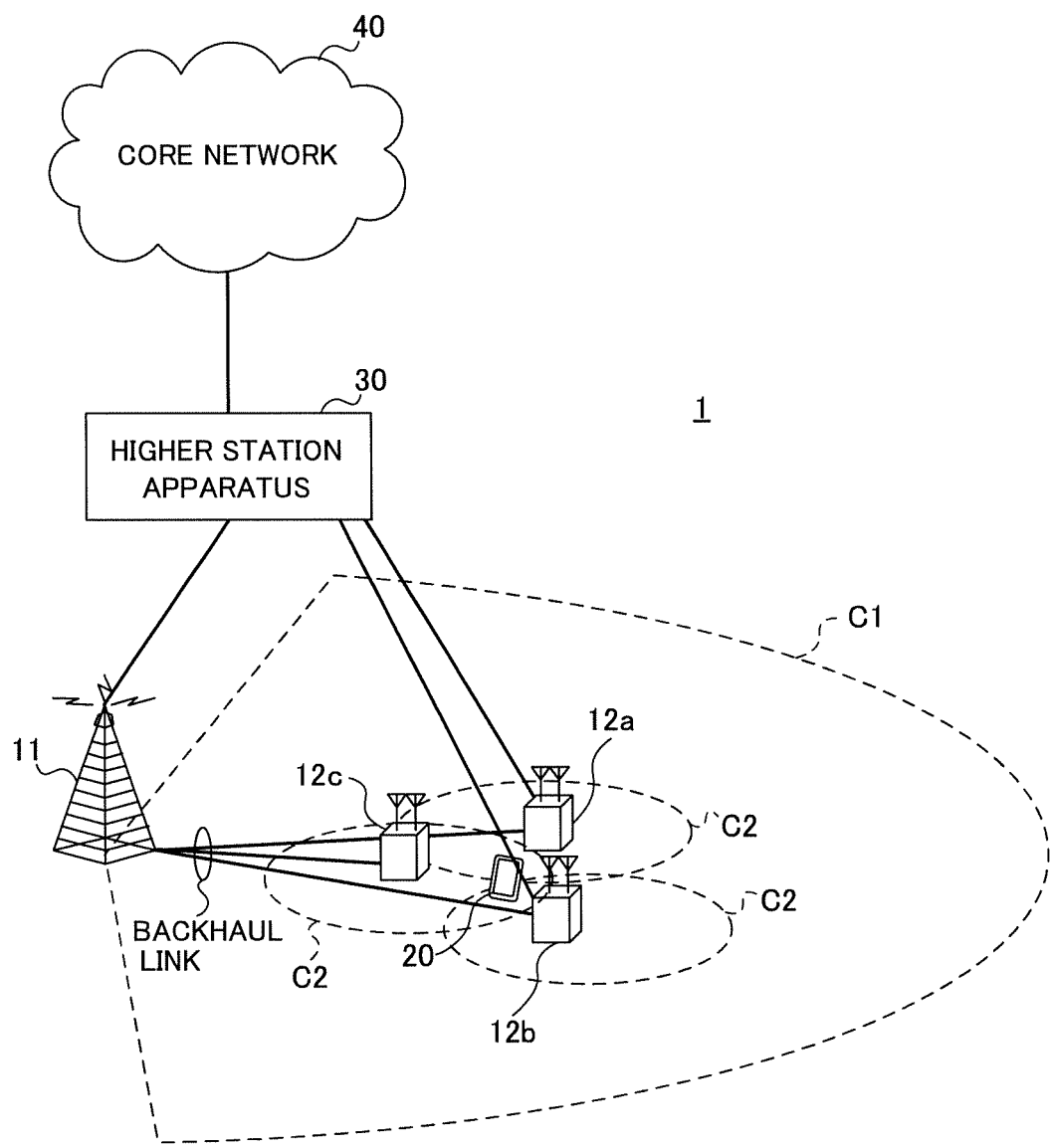
FIG. 7 is a diagram to show an example of a schematic structure of a radio communication system according to an embodiment of the present invention.

FIG. 7 is a diagram to show an example of a schematic structure of a radio communication system according to an embodiment of the present invention. Note that the radio communication system shown in FIG. 7 is a system to incorporate, for example, an LTE system, super 3G, an LTE-A system and so on. This radio communication system can adopt carrier aggregation (CA) to group a plurality of fundamental frequency blocks (component carriers) into one, where the LTE system bandwidth constitutes one unit, and/or adopt dual connectivity (DC). Note that this radio communication system may be referred to as "IMT-Advanced," or may be referred to as "4G" or "FRA" (Future Radio Access).

The radio communication system 1 shown in FIG. 7 includes a radio base station (macro base station) 11, which forms a macro cell C1, and radio base stations (small base stations) 12a to 12c, which are placed in the macro cell C1 and which form small cells C2 that are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information for the DRS detection of the radio base stations 12 (for example, a list of small cell identifiers (IDs)) from the radio base station 11 to the user terminals 20. Also, when CA is used, a structure may be employed in which one radio base station (for example, the radio base station 11) controls the scheduling of the macro cell and the small cells.

Note that it is equally possible to use a structure in which a user terminal 20 connects with a radio base station 12, without connecting with the radio base station 11. For example, it is possible to use a structure in which a radio base station 12 connects with a user terminal 20 in stand-alone. In this case, the radio base station 12 controls the scheduling of small cells.

In the macro cell, communication can be carried out using a carrier of a relatively low frequency band (for example, 2 GHz) and a narrow bandwidth (referred to as, for example, an "existing carrier," a "legacy carrier," and so on). On the other hand, in the small cells, a carrier of a relatively high frequency band (for example, 3.5 GHz, 5 GHz and so on) and a wide bandwidth may be used, or the same carrier as that of the macro cell may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as a "radio base station 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, synchronization signals, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is transmitted by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. Random access preambles (RA preambles) for establishing connections with cells are communicated by the PRACH.

Figure 8:
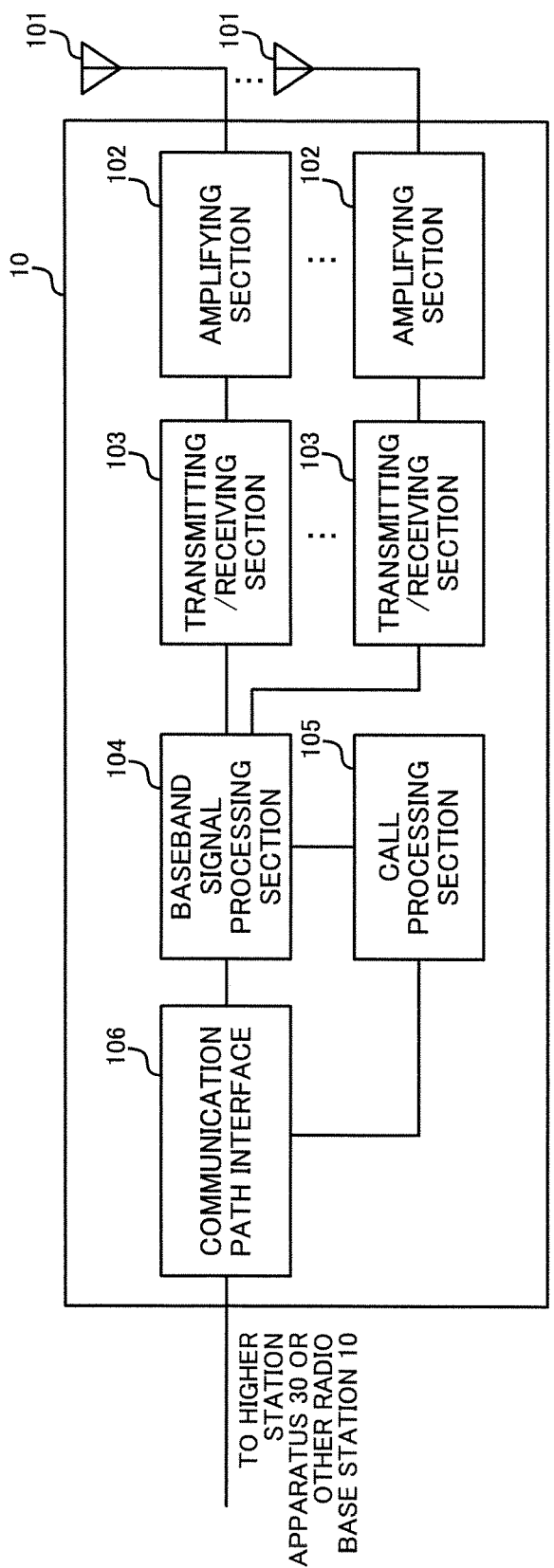
FIG. 8 is a diagram to show an example of an overall structure of a radio base station according to an embodiment of the present invention.

FIG. 8 is a diagram to show an example of an overall structure of a radio base station 10 according to the present embodiment. The radio base station 10 has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 may be comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Also, the baseband signal processing section 104 reports, to the user terminal 20, control information (system information) for allowing communication in the cell formed by the radio base station 10, through higher layer signaling (for example, RRC signaling, broadcast information and so on). The information for allowing communication in the cell includes, for example, the system bandwidth on the uplink, the system bandwidth on the downlink, and so on.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives the uplink signals amplified in the amplifying sections 102. The received signals are converted into the baseband signal through frequency conversion in the transmitting/receiving sections 103 and output to the baseband signal processing section 104. Also, the transmitting/receiving sections 103 receive a signal that includes predetermined information about the PUSCH transmission from the user terminal 20, and outputs this to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.). For example, the communication path interface 106 may transmit and receive information that is needed for DRS detection (for example, the DRS measurement period, the DRS cycle and so on) with neighboring radio base stations 10.

Figure 9:
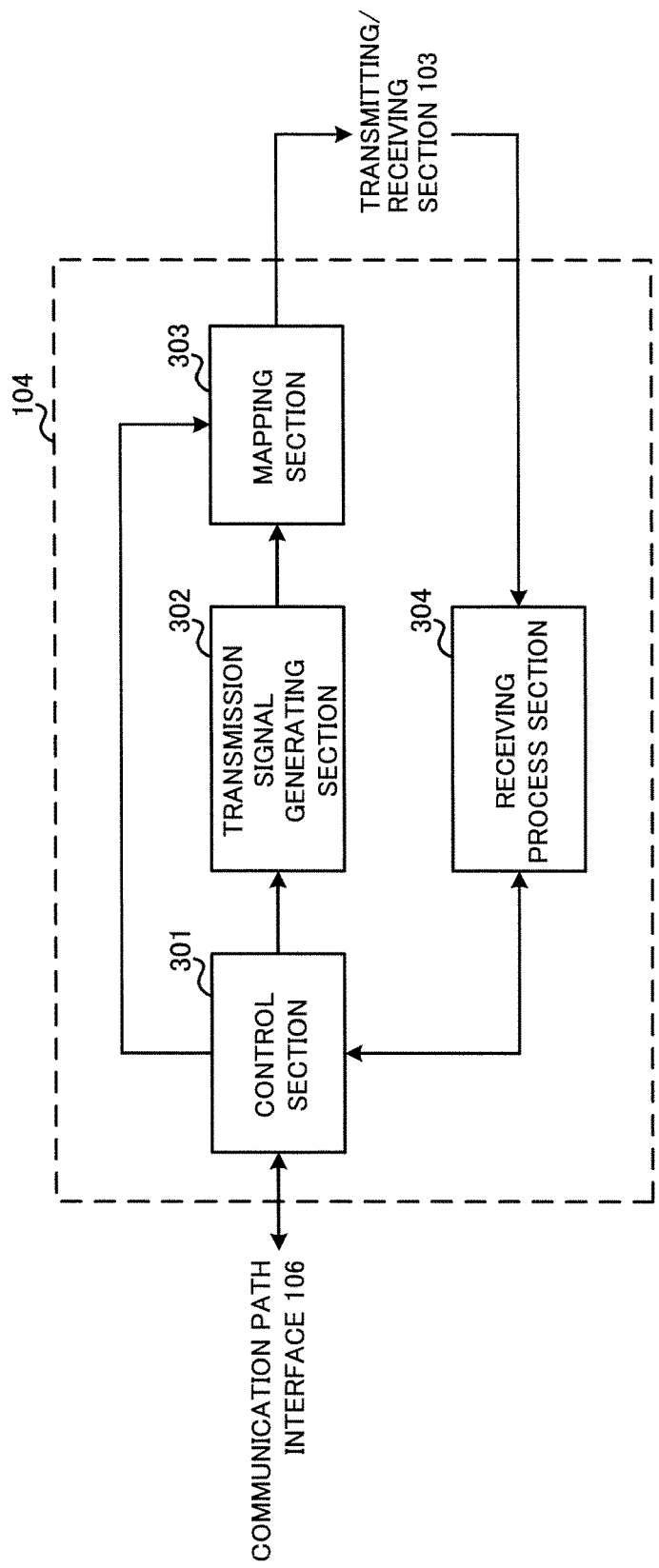
FIG. 9 is a diagram to show an example of a functional structure of a radio base station according to an embodiment of the present invention.

FIG. 9 is a diagram to show an example of a functional structure of a radio base station 10 according to the present embodiment. Note that, although FIG. 9 primarily shows functional blocks that pertain to characteristic parts of the present embodiment, the radio base station 10 has other functional blocks that are necessary for radio communication as well.

As shown in FIG. 9, the baseband signal processing section 104 provided in the radio base station 10 has a control section (scheduler) 301, a transmission signal generating section 302, a mapping section 303 and a receiving process section 304.

The control section (scheduler) 301 controls the scheduling of (for example, allocates resources to) downlink data signals that are transmitted in the PDSCH and downlink control signals that are communicated in the PDCCH and/or the enhanced PDCCH (EPDCCH). Also, the control section 301 controls the scheduling of downlink reference signals such as system information, synchronization signals, the CRS (Cell-specific Reference Signal), the CSI-RS (Channel State Information Reference Signal) and so on. Also, the control section 301 also controls the scheduling of uplink reference signals, uplink data signals that are transmitted in the PUSCH, uplink control signals that are transmitted in the PUCCH and/or the PUSCH, RA preambles that are transmitted in the PRACH, and so on. For the control section 301, a controller, a control circuit or a control device that can be described based on common understanding of the technical field to which the present invention pertains can be used.

The control section 301 in the radio base station 11 (macro base station) applies control so that DRS-based measurements are configured in the user terminal 20. In this case, it is equally possible to control the transmission signal generating section 302 and the mapping section 303 to report assist information for DRS detection.

Also, the control section 301 in the radio base station 11 (macro base station) acquires, via the communication path interface 106, information about the DRS-based measurements of each radio base station 12 (small base station) that forms the small cells included in the macro cell. To be more specific, the state of synchronization, the cell ID, the CSI-RS configuration and so on of each small cell are acquired. In this case, the control section 301 determines the synchronized sets based on the state of synchronization of each cell that transmits the CSI-RS in a predetermined frequency, and controls the transmission signal generating section 302 and the mapping section 303 to generate signals that include the determined synchronized sets and to report these to the user terminal 20.

Also, the control section 301 in the radio base station 11 (macro base station) may determine the small cells with which the user terminal 20 connects, based on the measurement results of the user terminal 20 in the DRS measurement period. In this case, the control section 301 controls the transmission signal generating section 302 and the mapping section 303 to send a report to the radio base station 12 to the effect of connecting with the user terminal 20, via the communication path interface 106, and, furthermore, send a report to the user terminal 20 to the effect of connecting with the above radio base station 12 in a small cell, via the transmitting/receiving sections 103.

The control section 301 in the radio base station 12 (small base station) controls the transmission signal generating section 302 and the mapping section 303 to transmit the DRS in a predetermined frequency. Also, the control section 301 may transmit and receive information about DRS-based measurements, with the macro base station and other small base stations, via the communication path interface 106.

Note that the control section 301 in the radio base station 11 may have the functions of the control section 301 of the radio base stations 12. Also, the control section 301 in the radio base stations 12 may have the functions of the control section 301 in the radio base station 11.

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on. For the transmission signal generating section 302, a signal generator or a signal generating circuit that can be described based on common understanding of the technical field to which the present invention pertains can be used.

The mapping section 303 maps the downlink signals generated in the transmission signal generating section 302 to radio resources based on commands from the control section 301, and outputs these to the transmitting/receiving sections 103. For the mapping section 303, a mapping circuit or a mapper that can be described based on common understanding of the technical field to which the present invention pertains can be used.

The receiving process section 304 performs receiving processes (for example, demapping, demodulation, decoding and so on) of UL signals (for example, delivery acknowledgement signals (HARQ-ACK), data signals that are transmitted in the PUSCH, and so on) transmitted from the user terminals. Also, the receiving process section 304 may measure the received power (RSRP), channel states and so on by using the received signals. Note that the processing results and the measurement results may be output to the control section 301. For the receiving process section 304, a signal processor/measurer, or a signal processing circuit/measurement circuit that can be described based on common understanding of the technical field to which the present invention pertains can be used.

Figure 10:
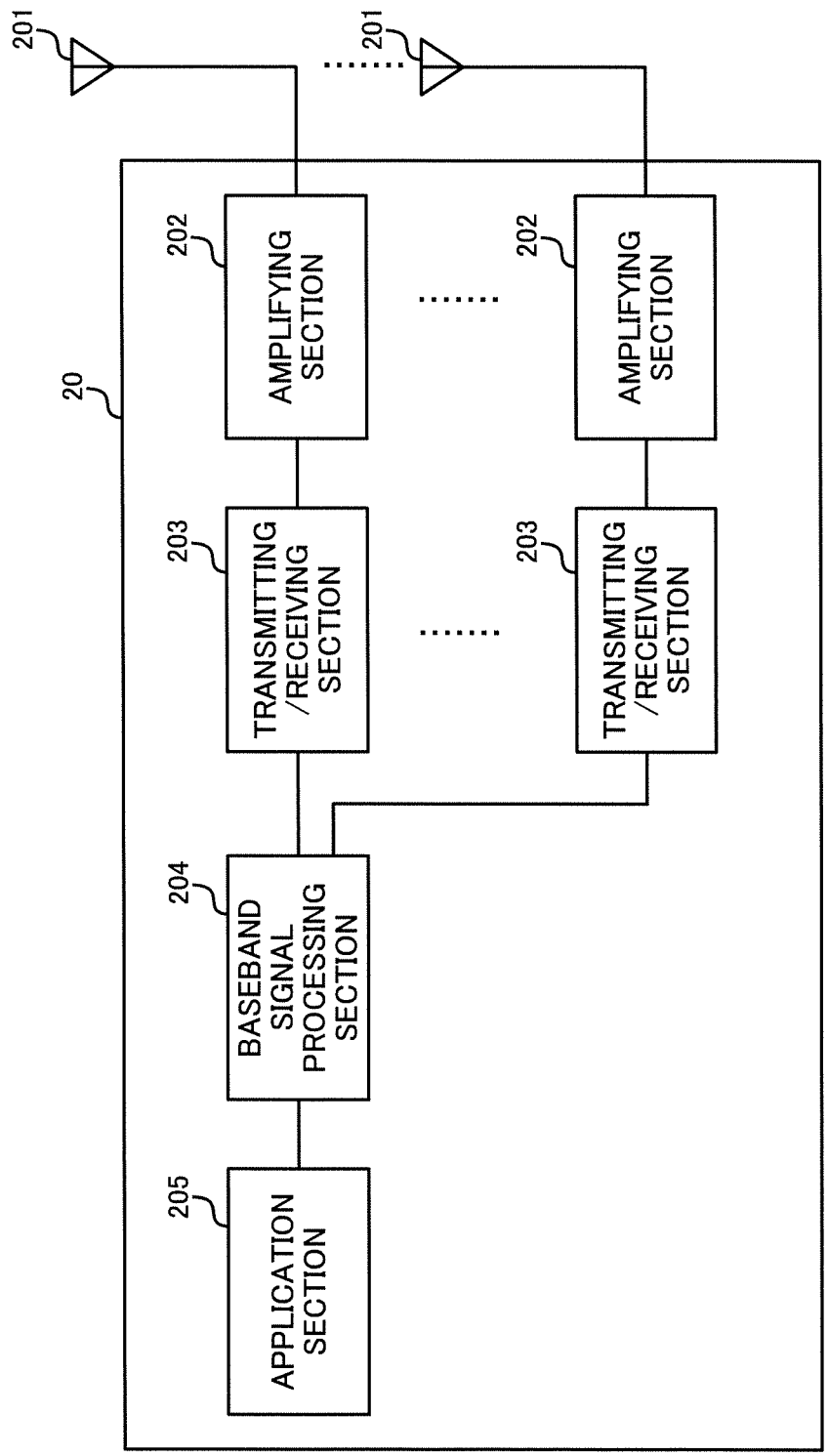
FIG. 10 is a diagram to show an example of an overall structure of a user terminal according to an embodiment of the present invention.

FIG. 10 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmission sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections 203 can transmit and receive the UL and/or DL signals in small cells. For example, the transmitting/receiving sections 203 receive DRSs (detection measurement signals) in small cells and output these to the baseband signal processing section 204. Note that the transmitting/receiving sections 203 may be capable of transmitting/receiving UL/DL signals in the macro cell as well. For example, the transmitting/receiving sections 203 may receive synchronized sets in the macro cell and outputs these to the baseband signal processing section 204. For the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signals that are input are subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 11:
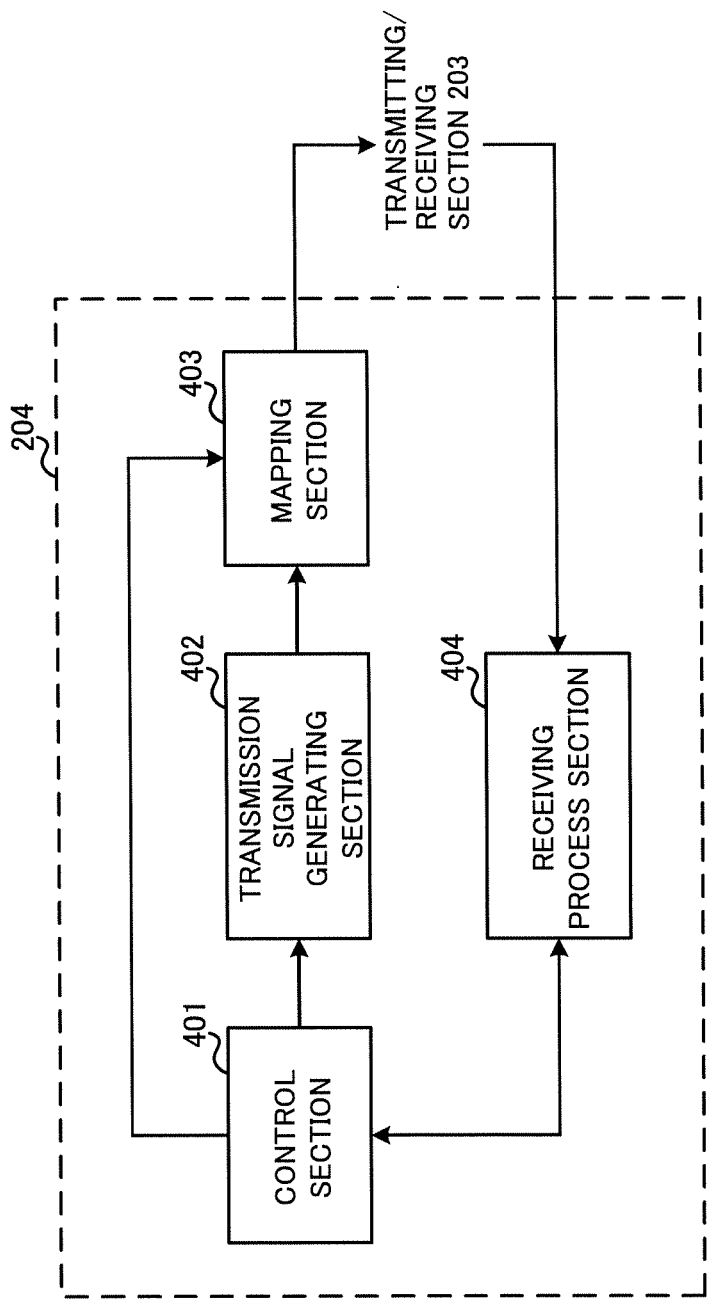
FIG. 11 is a diagram to show an example of a functional structure of a user terminal according to an embodiment of the present invention.

FIG. 11 is a diagram to show an example of a functional structure of a user terminal according to the present embodiment. Note that, although FIG. 11 primarily shows functional blocks that pertain to characteristic parts of the present embodiment, the user terminal 20 has other functional blocks that are necessary for radio communication as well.

As shown in FIG. 11, the baseband signal processing section 204 provided in the user terminal 20 has a control section 401, a transmission signal generating section 402, a mapping section 403 and a receiving process section 404.

The control section 401 acquires the downlink control signals (signals transmitted in the PDCCH/EPDCCH) and downlink data signals (signals transmitted in the PDSCH) transmitted from the radio base station 10, from the receiving process section 404. The control section 401 controls the generation of uplink control signals (for example, delivery acknowledgement signals (HARQ-ACK) and so on) and uplink data signals based on the downlink control signals, the results of deciding whether or not retransmission control is necessary for the downlink data signals, and so on. To be more specific, the control section 401 controls the transmission signal generating section 402 and the mapping section 403. For the control section 401, a controller, a control circuit or a control device that can be described based on common understanding of the technical field to which the present invention pertains can be used.

Also, the control section 401 controls the detection of DRSs transmitted from the small base stations (for example, radio base stations 12) in the receiving process section 404 based on information about DRS-based measurements that is input from the receiving process section 404. For example, the control section 401 controls the receiving process section 404 to perform DRS receiving processes in adequate DRS measurement periods and DRS cycles based on DMTCs (Discovery Measurement Timing Configuration).

The control section 401 selects one of the PSSs/SSSs included in the DRS to use as a reference for CSI-RS detection timings. For example, the control section 401 may apply control so that the strongest PSS/SSS included in the DRS (having, for example, the highest RSRP, the highest RSRQ, and so on) and the timing indicated by this PSS/SSS is used for CSI-RS detection (first embodiment).

Also, the control section 401 may apply control so that a PSS/SSS that corresponds to the ID or ID group of a PSS/SSS that is reported from the radio base station 10 and that can be used as a CSI-RS detection timing is selected, and the timing indicated by this PSS/SSS is used for CSI-RS detection (second embodiment). For example, when a PCID group and a CSI-RS configuration ID group are included in a synchronized set that is input from the transmitting/receiving sections 203 via the receiving process section 404, the control section 401 of the user terminal can use any of the PSS/SSS timings that relate to this PCID group as a common timing to detect each CSI-RS indicated in this CSI-RS configuration ID group.

The control section 401 commands the receiving process section 404 to measure the channel state measurement signal (for example, the CSI-RS) included in the DRS, based on the timing indicated by the synchronization signal (for example, the PSS/SSS) that is selected.

Also, the control section 401 controls the transmission signal generating section 402 and the mapping section 403 to report the CRS and CSI-RS measurement results (for example, the RSRP, the RSRQ, the RSSI and so on) that are input from the receiving process section 404, to the radio base station 10, with the physical cell ID and the TP identification information of the measured cell.

The transmission signal generating section 402 generates UL signals (uplink control signals, uplink data signals, uplink reference signals and so on) based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is contained in a downlink control signal reported from the radio base station 10, the control section 401 commands the transmission signal generating section 402 to generate an uplink data signal. For the transmission signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and output the result to the transmitting/receiving section 203. For the mapping section 403, a mapping circuit or a mapper that can be described based on common understanding of the technical field to which the present invention pertains can be used.

The receiving process section 404 performs receiving processes (for example, demapping, demodulation, decoding and so on) of DL signals (for example, downlink control signals transmitted from the radio base station, downlink data signals transmitted in the PDSCH, and so on). When receiving information related to the configuration of DRS-based measurements and so on from the radio base station 10, the receiving process section 404 outputs this to the control section 401. Also, the receiving process section 404 may measure the received power (RSRP) and channel states by using the received signals. To be more specific, the receiving process section 404 detects and measures the CRS, the CSI-RS and so on included in DRS, based on commands from the control section 401. Note that the processing results and the measurement results may be output to the control section 401. For the receiving process section 404, a signal processor/measurer, or a signal processing circuit/measurement circuit that can be described based on common understanding of the technical field to which the present invention pertains can be used.

Also, the receiving process section 404 performs the receiving processes of the information about the configuration of DRS-based measurements included in signals from the radio base station 10 (for example, the radio base station 11). The receiving process section 404 outputs assist information for DRS detection, such as the DMTC (Discovery Measurement Timing Configuration) included in the received signals, to the control section 401.

Note that the block diagrams that have been used to describe the above embodiments show blocks in functional units. These functional blocks (components) may be implemented in arbitrary combinations of hardware and software. Also, means for implementing each functional block is not particularly limited. That is, each functional block may be implemented with one physically-integrated device, or may be implemented by connecting two physically separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and the user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and the user terminals 20 may include input devices such as input keys and output devices such as displays.

The functional structures of radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2014-162313, filed on Aug. 8, 2014, including the specification, drawings and abstract, is incorporated herein by reference in its entirety.

The invention claimed is:

1. A user terminal comprising:
a receiving section that receives a detection/measurement signal including a synchronization signal and a channel state measurement signal, and information including a first identifier that relates to the synchronization signal and a second identifier that relates to a channel state measurement signal corresponding to the synchronization signal, wherein the receiving section further receives a plurality of pieces of information that include a combination of the first identifier and the second identifier; and
a control section that controls to measure the channel state measurement signal identified by the second identifier based on the synchronization signal corresponding to the first identifier, wherein the control section further controls to measure the channel state measurement signal that is identified by the second identifier of a given combination, based on the synchronization signal corresponding to the first identifier of the given combination.

2. The user terminal according to claim 1, wherein the control section controls to measure, based on the synchronization signal corresponding to the first identifier and included in a given detection/measurement signal, a channel state measurement signal that is identified by the second identifier and is included in another detection/measurement signal different from the given detection/measurement signal.

3. The user terminal according to any one of claim 1, wherein the second identifier is a CSI-RS (Channel State Information Reference Signal) configuration ID.

4. The user terminal according to claim 1, wherein the first identifier is a physical cell ID.

5. A radio base station comprising:
a transmission section that transmits a detection/measurement signal including a synchronization signal and a channel state measurement signal, and information including a first identifier that relates to the synchronization signal and a second identifier that relates to a channel state measurement signal corresponding to the synchronization signal, to a user terminal, wherein the transmission section further transmits a plurality of pieces of information that include a combination of the first identifier and the second identifier; and
a receiving section that receives, from the user terminal, a measurement result of the channel state measurement signal identified by the second identifier, based on the synchronization signal corresponding to the first identifier, wherein the measurement result is based on the channel state measurement signal that is identified by the second identifier of a given combination, based on the synchronization signal corresponding to the first identifier of the given combination.

6. A radio communication method comprising:
receiving a detection/measurement signal including a synchronization signal and a channel state measurement signal, and information including a first identifier that relates to the synchronization signal and a second identifier that relates to a channel state measurement signal corresponding to the synchronization signal;
receiving a plurality of pieces of information that include a combination of the first identifier and the second identifier;
controlling to measure the channel state measurement signal identified by the second identifier based on the synchronization signal corresponding to the first identifier; and
controlling to measure the channel state measurement signal that is identified by the second identifier of a given combination, based on the synchronization signal corresponding to the first identifier of the given combination.

7. A radio communication system comprising a radio base station that foul's a cell and a user terminal that is able to communicate with the radio base station, wherein the user terminal comprises:
a receiving section that receives a detection/measurement signal including a synchronization signal and a channel state measurement signal, and information including a first identifier that relates to the synchronization signal and a second identifier that relates to a channel state measurement signal corresponding to the synchronization signal, wherein the receiving section further receives a plurality of pieces of information that include a combination of the first identifier and the second identifier; and a control section that controls to measure the channel state measurement signal identified by the second identifier based on the synchronization signal corresponding to the first identifier, wherein the control section further controls to measure the channel state measurement signal that is identified by the second identifier of a given combination, based on the synchronization signal corresponding to the first identifier of the given combination.

8. The user terminal according to claim 2, wherein:

the receiving section receives a plurality of pieces of information that include a combination of the first identifier and the second identifier; and the control section controls to measure the channel state measurement signal that is identified by the second identifier of a given combination, based on the synchronization signal corresponding to the first identifier of the given combination.

9. The user terminal according to any one of claim 2, wherein the second identifier is a CSI-RS (Channel State Information Reference Signal) configuration ID.

10. The user terminal according to claim 2, wherein the first identifier is a physical cell ID.

11. The user terminal according to claim 3, wherein the first identifier is a physical cell ID.

* * * * *